(12) United States Patent
Ozaki

(10) Patent No.: US 9,509,872 B2
(45) Date of Patent: Nov. 29, 2016

(54) IMAGE READING APPARATUS AND NON-TRANSITORY COMPUTER-READABLE MEDIUM HAVING IMAGE READING PROGRAM

(71) Applicant: BROTHER KOGYO KABUSHIKI KAISHA, Nagoya-shi, Aichi-ken (JP)

(72) Inventor: Kazumasa Ozaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/844,068

(22) Filed: Sep. 3, 2015

(65) Prior Publication Data

US 2016/0072971 A1 Mar. 10, 2016

(30) Foreign Application Priority Data

Sep. 5, 2014 (JP) ................. 2014-181719

(51) Int. Cl.
*G06F 3/12* (2006.01)
*H04N 1/00* (2006.01)
*H04N 1/32* (2006.01)

(52) U.S. Cl.
CPC ........ *H04N 1/00482* (2013.01); *H04N 1/0097* (2013.01); *H04N 1/00244* (2013.01); *H04N 1/00411* (2013.01); *H04N 1/00429* (2013.01); *H04N 1/00811* (2013.01); *H04N 1/00938* (2013.01); *H04N 1/32507* (2013.01);
(Continued)

(58) Field of Classification Search
None
See application file for complete search history.

(56) References Cited

U.S. PATENT DOCUMENTS 8,656,033 B2 * 2/2014 Yoshida ............... G06Q 10/107
358/1.15
2007/0211301 A1 9/2007 Hayashi
2008/0252918 A1 10/2008 Nagata
(Continued)

FOREIGN PATENT DOCUMENTS

EP 1511287 A2 3/2005
JP H09-204515 A 8/1997
(Continued)

OTHER PUBLICATIONS

U.S. Office Action dated Dec. 5, 2013 issued in related U.S. Appl. No. 13/591,608.
(Continued)

*Primary Examiner* — Dov Popovici
(74) *Attorney, Agent, or Firm* — Scully, Scott, Murphy & Presser, P.C.

(57) ABSTRACT

An image reading apparatus includes a storage storing shortcut information having specific information for specifying an external apparatus as a transmission destination of read data and associated reading setting values set through an input device, and a control device which, when the input device receives an operation of selecting one shortcut information, determines whether activation information indicating the setting that the specific application is to be activated at the external apparatus specified by the specific information included in the selected shortcut information is stored, executes a first scan operation in accordance with reading setting values included in the selected shortcut information when the activation information is stored, and executes a second scan operation in accordance with reading setting values preset in the external apparatus specified by the specific information included in the selected shortcut information when the activation information is not stored.

14 Claims, 10 Drawing Sheets

(52) U.S. Cl.
CPC ........... *H04N2201/0081* (2013.01); *H04N 2201/0091* (2013.01)

(56) References Cited

U.S. PATENT DOCUMENTS

| | | |
|---|---|---|
| 2010/0079791 A1 | 4/2010 | Kim |
| 2010/0208297 A1 | 8/2010 | Takamiya |
| 2011/0090543 A1 | 4/2011 | Hashiguchi et al. |
| 2011/0176171 A1 | 7/2011 | Hagiuda et al. |
| 2013/0077115 A1 | 3/2013 | Ozaki |
| 2013/0088760 A1 | 4/2013 | Fujita et al. |

FOREIGN PATENT DOCUMENTS

| | | |
|---|---|---|
| JP | H09-284448 A | 10/1997 |
| JP | 2000-029592 A | 1/2000 |
| JP | 2004-172905 A | 6/2004 |
| JP | 2007-243743 A | 9/2007 |
| JP | 2007-312166 A | 11/2007 |
| JP | 2008-263321 A | 10/2008 |
| JP | 2009-261033 A | 11/2009 |
| JP | 2010-187089 A | 8/2010 |
| JP | 2013-074472 A | 4/2013 |

OTHER PUBLICATIONS

Notice of Allowance dated Feb. 11, 2014 issued in related U.S. Appl. No. 13/591,608.
European Office Action dated Apr. 23, 2004 issued in EP 12 180 359.7, Apr. 23, 2014.
Notification of Reasons for Refusal dated Sep. 10, 2013 issued in related Japanese Application No. 2011-212074, together with English translation.
Extended European Search Report dated Nov. 28, 2012 issued in EP 12180359.7.

\* cited by examiner

FIG. 2A

| APPARATUS NAME | FUNCTION INFORMATION | INFORMATION INDICATING WHETHER OR NOT ACTIVATION IS ALLOWED |
|---|---|---|
| USB | Scan to File | TO BE ACTIVATED |
| USB | Scan to E-mail | TO BE ACTIVATED |
| USB | Scan to OCR | NOT TO BE ACTIVATED |
| USB | Scan to Image | TO BE ACTIVATED |
| PC1 | Scan to File | TO BE ACTIVATED |
| PC1 | Scan to E-mail | TO BE ACTIVATED |
| PC1 | Scan to OCR | TO BE ACTIVATED |
| PC1 | Scan to Image | TO BE ACTIVATED |
| PC2 | Scan to File | NOT TO BE ACTIVATED |
| PC2 | Scan to E-mail | NOT TO BE ACTIVATED |
| PC2 | Scan to OCR | NOT TO BE ACTIVATED |
| PC2 | Scan to Image | NOT TO BE ACTIVATED |
| ⋮ | ⋮ | ⋮ |

FIG. 2B

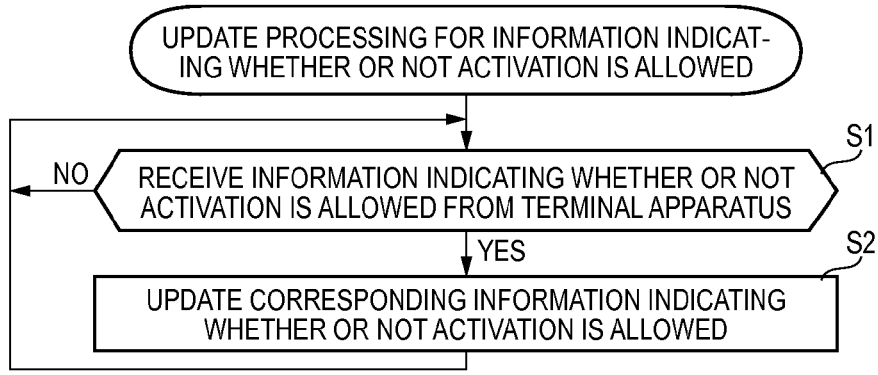

FIG. 5

INPUT SCAN CONDITION

| SETTING ITEMS | READING SETTING VALUES |
|---|---|
| SCAN TYPE | COLOR |
| RESOLUTION | 300dpi |
| FILE FORMAT | PDF |
| DOCUMENT SIZE | A4 |
| INCLINATION CORRECTION | On |
| WHITE SHEET REMOVAL | Off |
| BACKGROUND COLOR REMOVAL | On |

REGISTERED SCAN CONDITION

| SETTING ITEMS | READING SETTING VALUES |
|---|---|
| SCAN TYPE | MONOCHROME |
| RESOLUTION | 600dpi |
| FILE FORMAT | JPEG |
| DOCUMENT SIZE | Letter |
| INCLINATION CORRECTION | On |
| WHITE SHEET REMOVAL | On |
| BACKGROUND COLOR REMOVAL | Off |
| CONTRAST | 0 |
| BRIGHTNESS | 0 |
| AutoCrop | On |
| FILE NAME | scan_data |
| PRESERVATION DESTINATION | C:¥xxx¥yyy |

EXECUTION SCAN CONDITION

| SETTING ITEMS | READING SETTING VALUES |
|---|---|
| SCAN TYPE | COLOR |
| RESOLUTION | 300dpi |
| FILE FORMAT | PDF |
| DOCUMENT SIZE | A4 |
| INCLINATION CORRECTION | On |
| WHITE SHEET REMOVAL | Off |
| BACKGROUND COLOR REMOVAL | On |
| CONTRAST | 0 |
| BRIGHTNESS | 0 |
| AutoCrop | On |
| FILE NAME | scan_data |
| PRESERVATION DESTINATION | C:¥xxx¥yyy |

(Upper rows: INPUT SCAN CONDITION; Lower rows: SOME OF REGISTERED SCAN CONDITIONS)

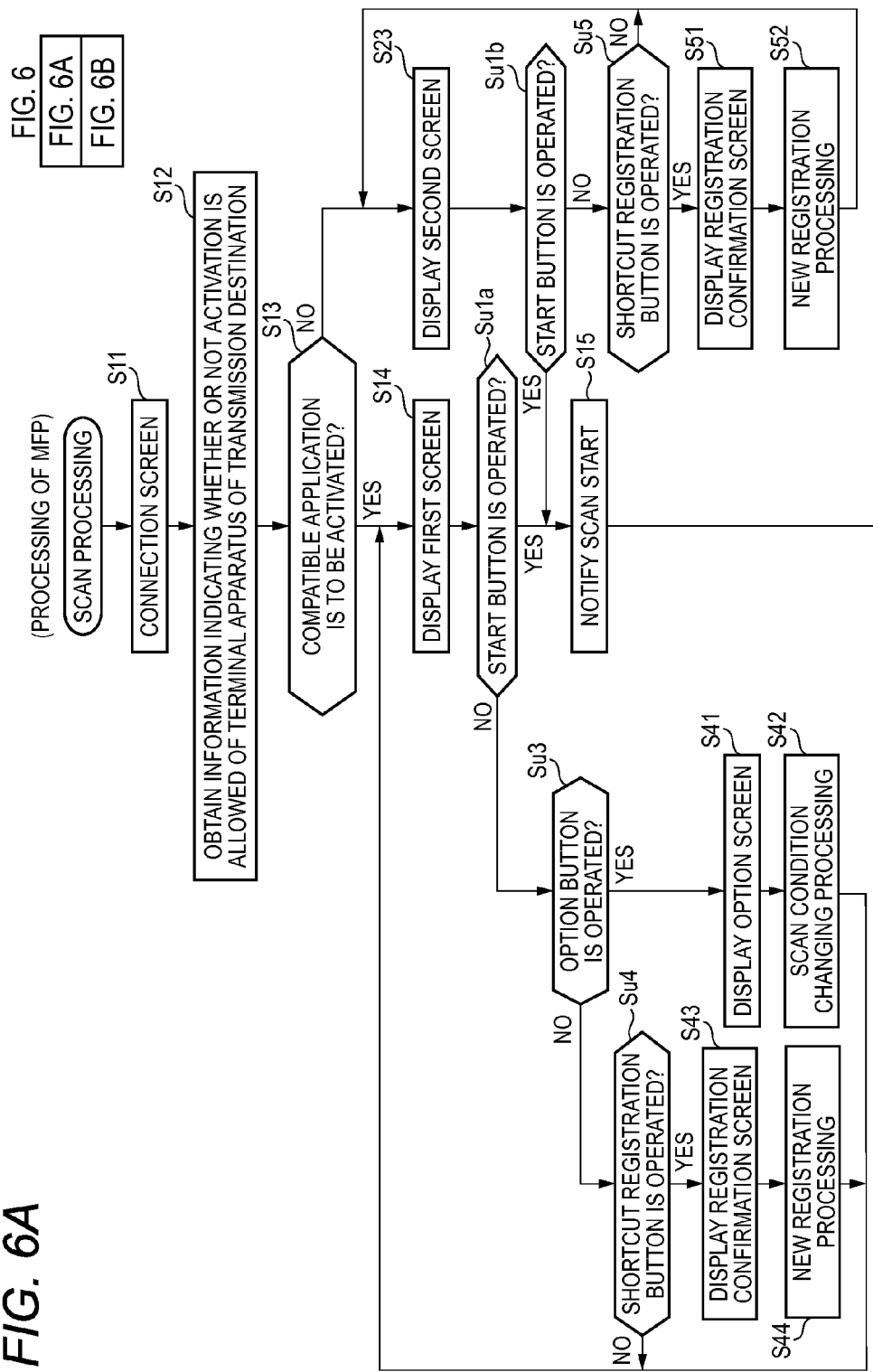

IMAGE READING APPARATUS AND NON-TRANSITORY COMPUTER-READABLE MEDIUM HAVING IMAGE READING PROGRAM

CROSS-REFERENCE TO RELATED APPLICATION

This application claims priority from Japanese Patent Application No. 2014-181719 filed on Sep. 5, 2014, the entire subject-matter of which is incorporated herein by reference.

TECHNICAL FIELD

The present disclosure relates to an image reading apparatus and a non-transitory computer-readable medium having an image reading program.

BACKGROUND

An image reading apparatus has been known which can use a first reading mode of executing a scan operation with placing priority on scan conditions received from a terminal apparatus and a second reading mode of executing the scan operation with placing priority on scan conditions received through an operation unit of the image reading apparatus.

SUMMARY

According to one illustrative aspect of the present disclosure, there may be provided an image reading apparatus comprising: a communication device configured to perform communication with an external apparatus; a reading device configured to execute a scan operation of reading a document; a display device; an input device configured to receive an operation; a storage storing shortcut information having specific information for specifying an external apparatus to be a transmission destination of read data obtained by the scan operation and reading setting values set on the basis of an operation received by the input device, the specific information and the reading setting values being associated with each other; and a control device configured to: receive activation information, indicating whether or not a setting of the specific application is to be activated at the external apparatus, from the external apparatus through the communication device; associate the received activation information with the specific information for specifying the external apparatus of the transmission source of the activation information and to store the associated information in the storage; in response to the input device receiving an operation of selecting one shortcut information from the shortcut information stored in the storage, determine whether the activation information, indicating the setting that the specific application is to be activated at the external apparatus specified by the specific information included in the selected shortcut information, is stored in the storage; when it is determined the activation information, indicating the setting that the specific application is to be activated, is stored, display a first screen on the display device, the first screen comprising the specific information, reading setting values and a first operation element, the reading setting values being included in the selected shortcut information, the first operation element being for inputting a start instruction of the scan operation; execute a first scan operation in accordance with the reading setting values included in the selected shortcut information, on condition that the input device receives an operation to the first operation element on the first screen; when it is determined the activation information, indicating the setting that the specific application is to be activated, is not stored, display a second screen on the display device without displaying the reading setting values included in the selected shortcut information, the second screen comprising the specific information of the shortcut information and the first operation element; receive reading setting values preset in the external apparatus from the external apparatus specified by the specific information included in the selected shortcut information through the communication device, on condition that the input device receives an operation to the first operation element on the second screen, and execute a second scan operation in accordance with the received reading setting values; and transmit read data, obtained by the first scan operation or the second scan operation, to the external apparatus specified by the specific information included in the selected shortcut information through the communication device.

BRIEF DESCRIPTION OF THE DRAWINGS

In the accompanying drawings:

FIG. 2A pictorially shows a table indicating whether or not activation is allowed, and FIG. 2B is a flowchart showing processing of updating information indicating whether or not activation is allowed;

FIG. 5 shows processing of setting execution scan conditions from registered scan conditions and input scan conditions;

FIGS. 6A-6B are flowcharts showing scan processing;

DETAILED DESCRIPTION

Figure 1:
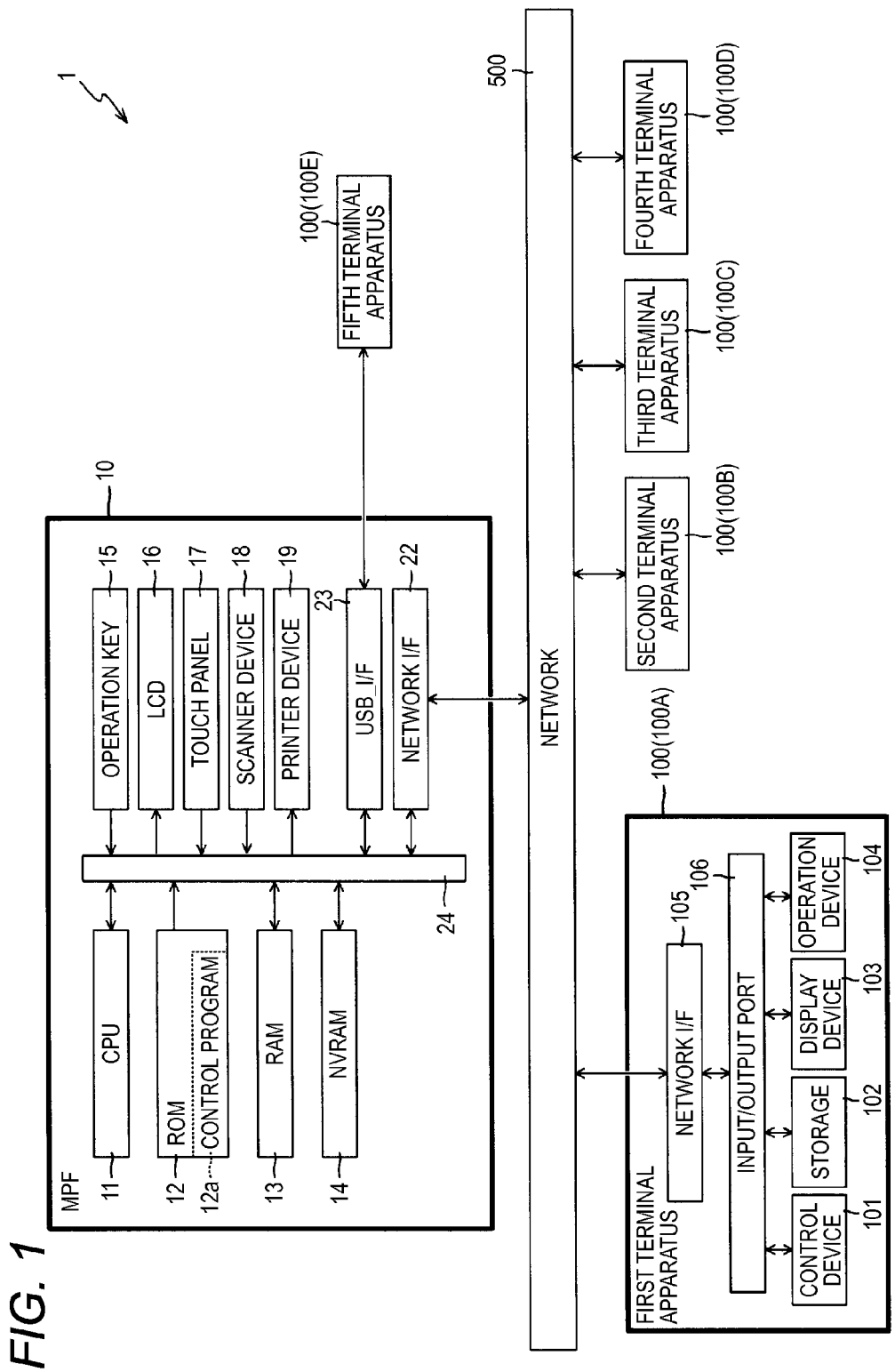
FIG. 1 is a block diagram showing an entire configuration of a system.

Hereinafter, preferred illustrative embodiments of the present disclosure will be described with reference to the accompanying drawings. A first illustrative embodiment of the present disclosure is first described with reference to FIGS. 1 to 6. FIG. 1 is a block diagram showing an entire configuration of a system 1 including a multifunctional peripheral (hereinafter, referred to as 'MFP') 10, which is an illustrative embodiment of the image reading apparatus of the present disclosure. The system 1 includes the MFP 10 and a plurality of terminal apparatuses 100.

In the example of FIG. 1, the five terminal apparatuses 100 (a first terminal apparatus 100A, a second terminal apparatus 100B, a third terminal apparatus 100C, a fourth terminal apparatus 100D and a fifth terminal apparatus 100E) are shown. Since all of the terminal apparatuses 100A to 100E have a common basic configuration, only an internal configuration of the first terminal apparatus 100A is shown and the internal configurations of the other terminal apparatuses 100B to 100E are not shown.

The first terminal apparatus 100A is a PC or a server computer, for example. The first terminal apparatus 100A is mainly provided with a control device 101, a storage 102, a display device 103, an operation device 104, and a network I/F 105. The respective devices are connected to each other through an input/output port 106.

The control device 101 includes a CPU, and a ROM and a RAM electrically connected to the CPU, which are not shown, and configures a computer. The CPU is configured to control operations of the first terminal apparatus 100A, in response to programs and data stored in the ROM and the storage 102. The storage 102 is a non-volatile storage device. The storage 102 is a hard disk drive, for example. Scan conditions received through the operation device 104 by the first terminal apparatus 100A are registered in advance in the storage 102. The display device 103 is a liquid crystal display device, for example. The operation device 104 is a keyboard, a pointing device and the like, for example.

In the ROM of the control device 101 and the storage 102, a variety of programs such as an operating system, an application software (hereinafter, simply referred to as 'application') capable of processing read data received from the MFP 10, a scan management program configured to manage scan operations by the MFP 10 and the like are stored. In the meantime, the application capable of processing the read data received from the MFP 10 includes an application capable of interpreting scan conditions received from the MFP 10 and an application incapable of interpreting the scan conditions. In this illustrative embodiment, the former application is referred to as a compatible application. In a sequence diagram of FIG. 3, which will be described later, the respective processing that is to be executed by the terminal apparatus 100 is processing that is to be executed by the control device 101 in accordance with the scan management program.

The network I/F 105 is an interface for wired or wireless connection in communication with another apparatus through a network 500. The terminal apparatus 100A is connected in communication with the MFP 10 and the other terminal apparatuses 100B to 100D on the network 500 through the network I/F 105.

The MFP 10 has a plurality of functions such as a print function, a scan function, a copy function and the like. The MFP 10 is mainly provided with a CPU 11, a ROM 12, a RAM 13, an NVRAM 14, an operation key 15, an LCD 16, a touch panel 17, a scanner device 18, a printer device 19, a network interface (hereinafter, referred to as 'network I/F') 22, and a USB interface (hereinafter, referred to as 'USB_I/F') 23. The respective devices are connected to each other through an input/output port 24.

The CPU 11 is configured to control the respective functions of the MFP 10 and the respective devices connected to the input/output port 24, in response to programs and data stored in the ROM 12, the RAM 13, and the NVRAM 14. The ROM 12 is a read only memory configured to store therein a variety of programs to be executed by the CPU 11, and integers and tables that are to be referred to when the programs are executed. In the ROM 12, a control program 12a configured to control operations of the MFP 10 and the like are stored. In the sequence diagram of FIG. 3, which will be described later, the respective processing that is to be executed by the MFP 10, and the respective processing shown in flowcharts of FIGS. 2B and 6 are processing that is to be executed by the CPU 11, in accordance with the control program 12a.

The RAM 13 is a rewritable volatile memory having a temporary area for temporarily storing a variety of data when executing the control program 12a by the CPU 11. The NVRAM 14 is a non-volatile RAM. In the NVRAM 14, a table 14a indicating whether or not activation is allowed, which will be described with reference to FIG. 2, is stored.

The operation key 15 is a mechanical key provided on a housing of the MFP 10, and is configured to receive a variety of setting values, instructions and the like from a user. The LCD 16 is a liquid crystal display apparatus, and is configured to display a variety of screens. On a screen of the LCD 16, the touch panel 17 is provided to overlap with the LCD 16. When a pointer such as a finger, a rod and the like is contacted or approximated to the screen of the LCD 16, the touch panel 17 detects the contacted or approximated position and inputs the detected position to the MFP 10.

The scanner device 18 is configured to execute a scan operation of reading an image of a document set on a document platen (not shown) and outputting read data corresponding to the read image. The printer device 19 is configured to print an image based on an image file to a recording sheet.

The network I/F 22 is an interface for wired or wireless connection in communication with another apparatus through the network 500. The MFP 10 is connected in communication with the terminal apparatuses 100A to 100D on the network 500 through the network I/F 22.

The USB_I/F 23 is a device for connection with a storage medium such as a USB memory and another apparatus such as a PC, a hard disk drive and the like through a USB plug, and is configured by a well-known device. In this illustrative embodiment, the USB_I/F 23 is connected with the fifth terminal apparatus 100E. Therefore, the MFP 10 is connected in communication with the fifth terminal apparatus 100E through the USB_I/F 23.

In the system 1 of this illustrative embodiment, when the MFP 10 receives an operation to a start button configured to instruct start of the scan operation, the scanner device 18 reads a document set on the document platen. More specifically, the scanner device 18 is configured to execute the scan operation by using the scan conditions corresponding to any one reading mode of a first reading mode and a second reading mode.

The first reading mode is a mode of enabling the scanner device 18 to execute the scan operation with placing priority on the scan conditions received from the terminal apparatus 100 such as the first terminal apparatus 100A. The second reading mode is a mode of enabling the scanner device 18 to execute the scan operation with placing priority on the scan conditions received through the touch panel 17 or the operation key 15.

In this illustrative embodiment, the MFP 10 has a plurality of minor functions corresponding to differences of processing for the read data obtained by the scan operation, as regards the scan function. Specifically, as the minor functions, Scan to File, Scan to E-mail, Scan to OCR, and Scan to Image are prepared.

'Scan to File' is a function with which the MFP 10 transmits the read data obtained by the scan operation to the designated terminal apparatus 100 and the terminal apparatus 100 preserves the transmitted read data in the storage 102 and the like.

'Scan to E-mail' is a function with which the MFP 10 transmits the read data obtained by the scan operation to the designated terminal apparatus 100 and the terminal apparatus 100 attaches the read data to a mail displayed on the display device 103.

'Scan to OCR' is a function with which the MFP 10 transmits the read data obtained by the scan operation to the designated terminal apparatus 100 and the terminal apparatus 100 recognizes characters on the read image on the basis of the read data to convert the same into text data.

'Scan to Image' is a function with which the MFP 10 transmits the read data obtained by the scan operation to the designated terminal apparatus 100 and the terminal apparatus 100 displays a read image based on the read data on the display device 103.

In this illustrative embodiment, the MFP 10 can register, as a shortcut, the scan conditions for the scan operation by the second reading mode in the NVRAM 14. Hereinafter, the shortcut in which the scan conditions for the scan operation by the second reading mode are registered is referred to as 'shortcut of the second reading mode'.

Specifically, information including a reading mode indicating the second reading mode, function information specifying a minor function to be used, scan conditions received through the touch panel 17 or the operation key 15, an apparatus name specifying the terminal apparatus 100 that is a transmission destination of the read data obtained by the scan operation in accordance with the scan conditions, and a registration name specifying a shortcut is registered as the shortcut of the second reading mode. Hereinafter, a combination of the respective information to be registered as the shortcut of the second reading mode is referred to as 'shortcut information'. When executing a reading operation by the second reading mode, the user can appropriately prepare the shortcut information through a specific screen such as a screen displayed on the LCD 16 and register the same as the shortcut of the second reading mode.

In the meantime, when using the minor function of transmitting the read data to the terminal apparatus 100, the reading by the second reading mode is possible on condition of a setting that the terminal apparatus 100 becoming a transmission destination of the read data activates an application (the compatible application, in this illustrative embodiment) capable of interpreting the scan conditions to be transmitted from the MFP 10.

For this reason, even though the shortcut of the second reading mode is registered, if the setting that the compatible application as regards the minor function indicated by the function information included in the shortcut is activated when a notice of scan start is received from the MFP 10 is not made at the terminal apparatus 100 indicated by the apparatus name included in the shortcut, the scanner device 18 cannot execute the scan operation in accordance with the scan conditions included in the shortcut.

Therefore, although described in detail later, when the MFP 10 of this illustrative embodiment uses the shortcut of the second reading mode, if the setting that the compatible application as regards the minor function indicated by the function information included in the shortcut is activated when a notice of scan start is received from the MFP 10 is made at the terminal apparatus 100 indicated by the apparatus name included in the shortcut, the scanner device 18 executes the scan operation in accordance with the scan conditions included in the shortcut. On the other hand, if the setting that the compatible application is to be activated when a notice of scan start is received from the MFP 10 is not made, the scanner device 18 executes the scan operation in accordance with the scan conditions received from the terminal apparatus 100.

FIG. 2A pictorially shows contents of the table 14a indicating whether or not activation is allowed. The table 14a indicating whether or not activation is allowed is a table for managing whether the compatible application is set to be activated in the respective terminal apparatuses 100 configuring the system 1, the terminal apparatuses 100A to 100E, in this illustrative embodiment.

As shown in FIG. 2A, in the table 14a indicating whether or not activation is allowed, an apparatus name 14a1, function information 14a2 and information 14a3 indicating whether or not activation is allowed are associated. The apparatus name 14a1 is information specifying the terminal apparatus 100. 'USB' is the terminal apparatus 100 connected to the MFP 10 through the USB_I/F 23. In the example of FIG. 1, the fifth terminal apparatus 100E corresponds to 'USB'. 'PC1', 'PC2' and the like are the terminal apparatuses 100 such as the terminal apparatus 100A connected to the MFP 10 through the network I/F 22. The function information 14a2 is information specifying the minor function such as 'Scan to File'.

The information 14a3 indicating whether or not activation is allowed is information indicating whether the compatible application as regards the minor function indicated by the function information 14a2 is set to be activated at the terminal apparatus 100 indicated by the apparatus name 14a1. In FIG. 2A, the information 14a3 indicating whether or not activation is allowed 'to be activated' indicates that the compatible application is installed in the terminal apparatus 100 indicated by the apparatus name 14a1 and the compatible application as regards the minor function indicated by the function information 14a2 is set to be activated when a notice of scan start is received from the MFP 10. On the other hand, the information 14a3 indicating whether or not activation is allowed 'not to be activated' indicates that the compatible application is not installed in the terminal apparatus 100 indicated by the apparatus name 14a1 or that although the compatible application is installed in the terminal apparatus 100, the compatible application as regards the minor function indicated by the function information 14a2 is set not to be activated when a notice of scan start is received from the MFP 10.

The table 14a indicating whether or not activation is allowed is configured to be updated whenever the information indicating whether or not activation is allowed notified, i.e., transmitted from the terminal apparatus 100 is received. In this illustrative embodiment, each terminal apparatus 100 is configured to periodically (for example, every 10 minutes) transmit the information indicating whether or not activation is allowed as regards all the function information to the MFP 10, and the MFP 10 is configured to receive the information indicating whether or not activation is allowed. When the MFP 10 receives the information indicating whether or not activation is allowed from the terminal apparatus 100, the information 14a3 indicating whether or not activation is allowed as regards each function information 14a2 of the apparatus name 14a1 indicating the terminal apparatus 100 of the transmission source is updated to the received information indicating whether or not activation is allowed.

FIG. 2B is a flowchart showing processing of updating information indicating whether or not activation is allowed, which is to be executed by the CPU 11 of the MFP 10. The processing is processing in which the MFP 10 updates the table 14a indicating whether or not activation is allowed by the information indicating whether or not activation is allowed which is received from the terminal apparatus 100. The processing starts when a power supply of the MFP 10 is turned on.

The CPU 11 waits for the information indicating whether or not activation is allowed is received from the terminal apparatus 100 (100A to 100E) in the system 1 (S1: No).

When the information indicating whether or not activation is allowed is received from the terminal apparatus 100 (S1: Yes), the CPU 11 updates the information 14a3 indicating whether or not activation is allowed as regards to each function information 14a2 of the apparatus name 14a1, which indicates the terminal apparatus 100 of the transmission source of the information indicating whether or not activation is allowed, in the table 14a indicating whether or not activation is allowed to the received information indicating whether or not activation is allowed (S2). After the processing of S2, the CPU 11 proceeds to the processing of S1.

Figure 3:
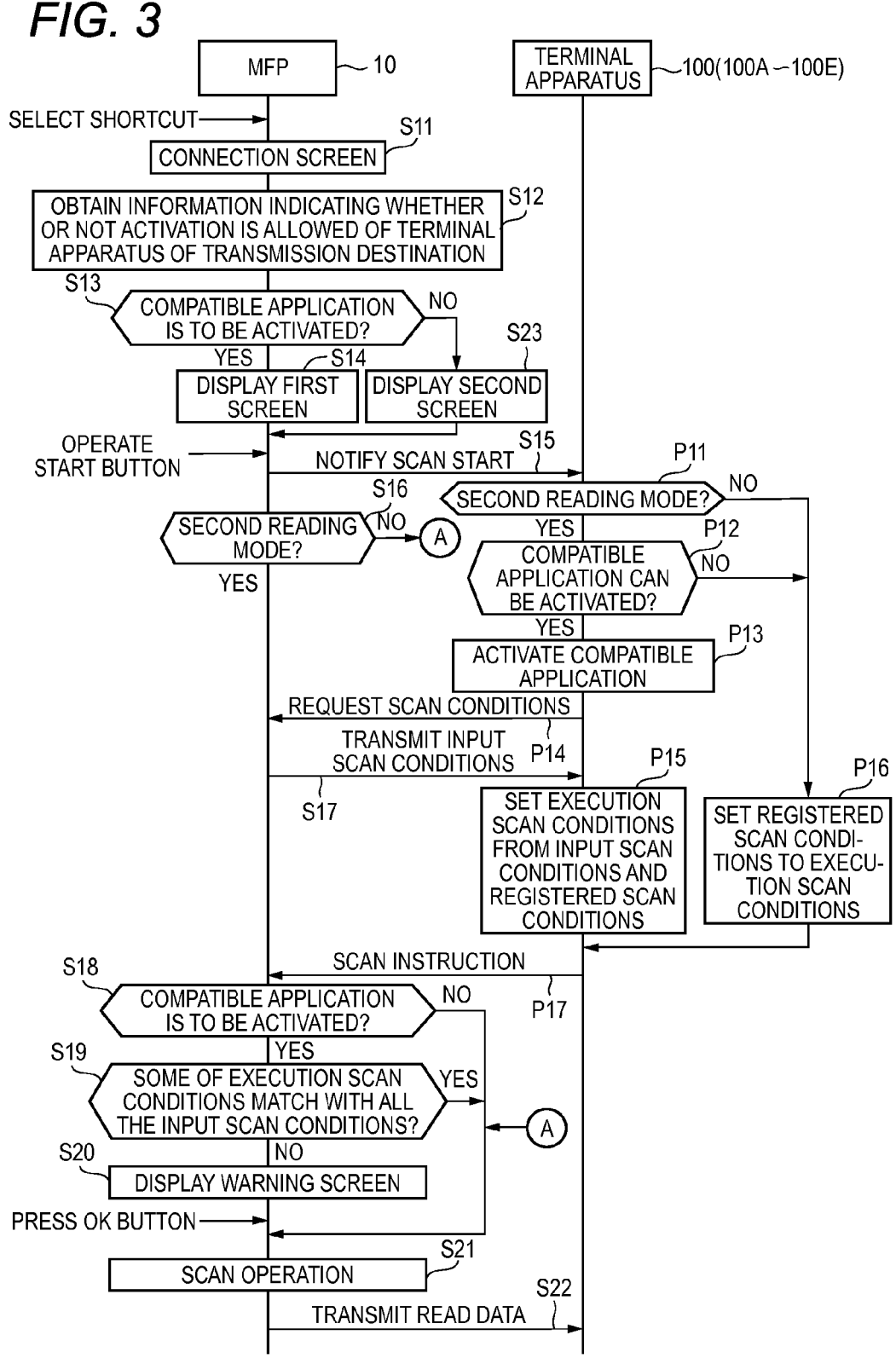
FIG. 3 is a sequence diagram showing respective operations of an MFP and a terminal apparatus when a scan operation is performed using a shortcut of a second reading mode.
Figure 4:
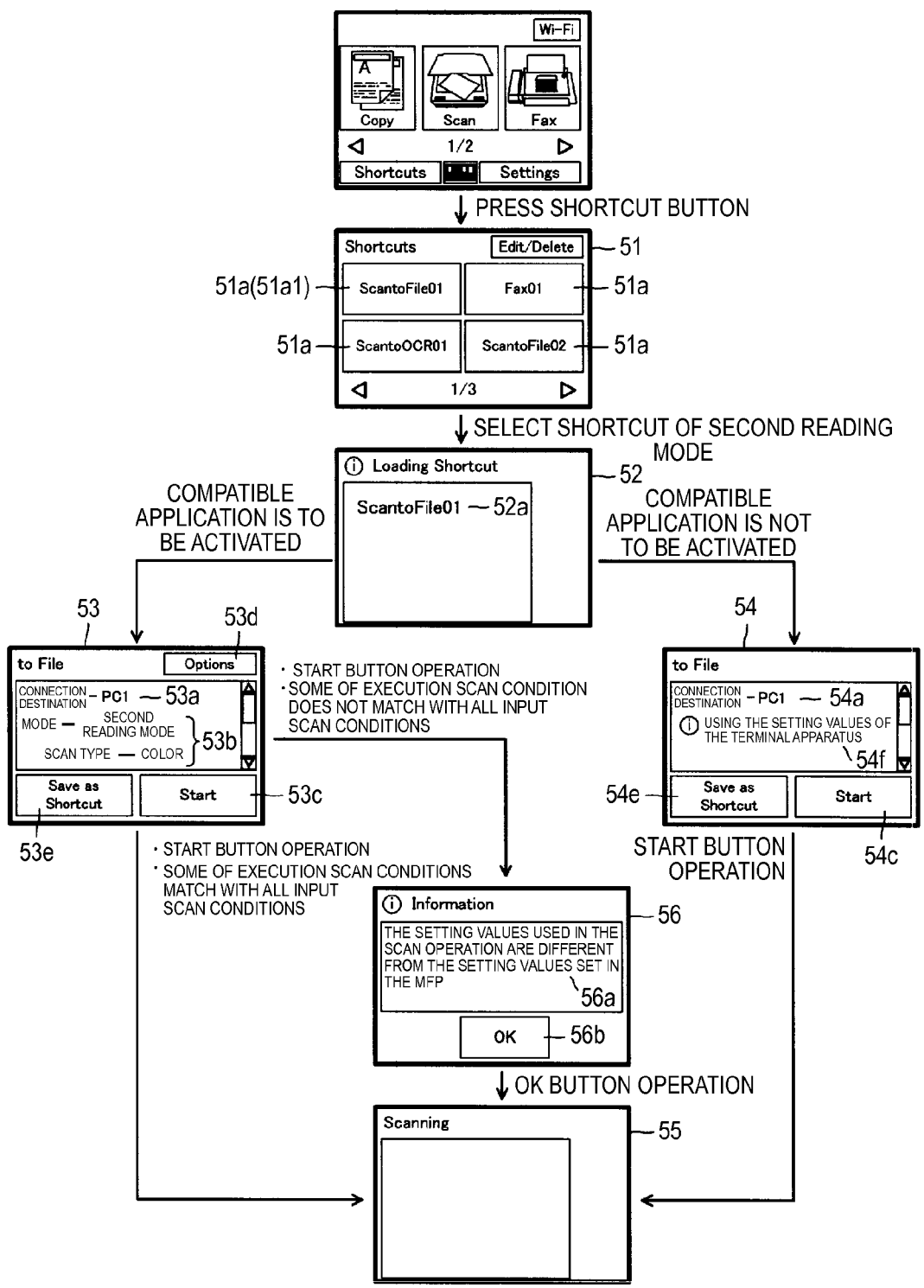
FIG. 4 illustrates an example of screen transition when the scan operation is performed using the shortcut of the second reading mode.

FIG. 3 is a sequence diagram showing respective operations of the MFP 10 and the terminal apparatus 100 (100A to 100E) in the system 1 when performing the scan operation by using the shortcut of the second reading mode. In the descriptions of FIG. 3, FIG. 4 is referred to, as required. Meanwhile, FIG. 4 illustrates an example of screen transition when the scan operation is performed using the shortcut of the second reading mode.

When a user selects a registration button relating to the shortcut of the second reading mode of registration buttons 51a of shortcuts displayed on a shortcut screen 51 (refer to FIG. 4), the CPU 11 of the MFP 10 receives the selection and displays a connection screen 52 (refer to FIG. 4), which indicates that the shortcut information included in the selected shortcut is being read, on the LCD 16 (S11).

As shown in FIG. 4, the four registration buttons 51a are displayed on the shortcut screen 51, for example. In each button 51a, a registration name of a corresponding shortcut is displayed. In this illustrative embodiment, it is assumed that a left and upper registration button 51a1 of the four registration buttons 51a is selected. The registration button 51a1 is a registration button relating to the shortcut of the second reading mode and the shortcut of which the registration name is 'ScantoFile01'.

In the connection screen 52 displayed by the processing of S11, a display 52a, which indicates the registration name of the selected shortcut, is displayed. Therefore, the user can recognize which shortcut is to be used for performing the scan operation by referring to contents of the display 52a.

The CPU 11 refers to the table 14a indicating whether or not activation is allowed, thereby obtaining the information 14a3 indicating whether or not activation is allowed as regards the minor function indicated by the function information 14a2 coinciding with the function information included in the shortcut with respect to the terminal apparatus 100 indicated by the apparatus name 14a1 coinciding with the apparatus name included in the selected shortcut (S12).

The CPU 11 determines whether the obtained information 14a3 indicating whether or not activation is allowed is the information indicating that the compatible application is to be activated when the notice of scan start is received from the MFP 10 (S13). When the CPU 11 determines that the compatible application is to be activated (S13: Yes), the CPU 11 displays a first screen 53 (refer to FIG. 4) on the LCD 16, instead of the connection screen 52 (S14), on condition that the reading of the shortcut information has been completed (S14).

On the other hand, when the CPU 11 determines that the compatible application is not to be activated (S13: No), the CPU 11 displays a second screen 54 (refer to FIG. 4) on the LCD 16, instead of the connection screen 52 (S14), on condition that the reading of the shortcut information has been completed (S23). Therefore, the screens, which are to be displayed on the LCD 16 depending on whether the compatible application is to be activated at the terminal apparatus indicated by the apparatus name included in the selected shortcut, i.e., the terminal apparatus becoming the transmission destination of the read data when the notice of scan start from the MFP 10 is received, are different.

As shown in FIG. 4, in the first screen 53, a display 53a, which indicates an apparatus name of a connection destination (i.e. a transmission destination of read data), a display 53b, which indicates a reading mode and scan conditions to be used, a start button 53c, an option button 53d, and a shortcut registration button 53e are displayed.

Specifically, in the display 53a, an apparatus name included in the selected shortcut is displayed. In the display 53b, the reading mode and scan conditions included in the selected shortcut are displayed. When both the reading mode and the scan conditions cannot be displayed as the display 53b, the user can see both the reading mode and the scan conditions by appropriately moving a scroll bar provided in the first screen 53. In the meantime, the scan conditions included in the shortcut of the second reading mode have reading setting values that are set for each setting item such as 'scan type'.

The start button 53c is a button for instructing start of the scan operation. The option button 53d is a button for changing the scan conditions. When an operation to the option button 53d is received, the CPU 11 displays an option screen (not shown) on the LCD 16. In the meantime, it is possible to appropriately change the reading setting values configuring the scan conditions and to change the reading mode from the second reading mode to the first reading mode in the option screen. After the first screen 53 is displayed, when the reading mode is changed to the first reading mode by the option screen, the scan operation is executed in accordance with scan conditions (hereinafter, referred to as 'registered scan conditions') registered in advance in the storage 102 of the terminal apparatus 100 of the connection destination. The shortcut registration button 53e is a button for registering the scan conditions displayed in the first screen 53, as a new shortcut.

In the meantime, as shown in FIG. 4, in the second screen 54, a display 54a, which indicates an apparatus name of the connection destination, a start button 54c, and a shortcut registration button 54e are displayed. That is, in the second screen 54, the reading mode and scan conditions included in the selected shortcut and the option button are not displayed, unlike the first screen 53.

The second screen 54 is a screen that is displayed when the compatible application is not to be activated at the terminal apparatus specified by the display 54a, i.e., the terminal apparatus of the connection destination when the notice of scan start is received from the MFP 10. That is, when the second screen 54 is displayed, the scan operation is executed in accordance with the registered scan conditions, i.e., the scan conditions received through the touch panel 17 and the like, not the scan conditions included in the selected shortcut.

For this reason, when the scan conditions included in the selected shortcut is displayed in the second screen 54, there is a possibility that the scan operation will be executed with conditions different from the displayed scan conditions. Therefore, there is a concern that the user will obtain a scan result different from the scan result that is assumed from the displayed scan conditions. In contrast, according to the illustrative embodiment, since the scan conditions included in the selected shortcut are not displayed in the second screen 54, it is possible to avoid the above problem. Also, since the option button is not displayed, it is possible to prevent the user from performing a useless operation of changing an unusable scan condition.

The start button 54c is a button for instructing start of the scan operation. The shortcut registration button 54e is a button for registering the scan conditions displayed in the second screen 54, as a new shortcut.

In the second screen 54, a message, which notifies the user that the registered scan conditions are to be used, is displayed. Therefore, the user can recognize from the message 54f that the registered scan conditions are to be used, not the scan conditions included in the shortcut, i.e., the scan conditions received through the touch panel 17 and the like.

Returning to FIG. 3, after the first screen 5 or the second screen 54 is displayed, when the user operates the start button 53c or 54c, the CPU 11 of the MFP 10 receives the operation, and notifies the scan start to the terminal apparatus 100 of the connection destination, which is specified by the apparatus name included in the selected shortcut (S15).

In the notice, a value of the current reading mode, and the function information included in the selected shortcut are included. In the meantime, the current reading mode is a reading mode included in the selected shortcut or a reading mode changed after the option button 53d is operated.

The control device 101 of the terminal apparatus 100 having received the notice of scan start determines whether the value of the reading mode included in the notice indicates the second reading mode (P11). When the control device 101 determines that the value of the reading mode indicates the first reading mode, not the second reading mode (P11: No), the control device 101 sets, as the registered scan condition, scan conditions (hereinafter, referred to as 'execution scan condition') that are to be used in an actual scan operation (P16).

On the other hand, when the control device 101 determines that the value of the reading mode indicates the second reading mode (P11: Yes), the control device 101 determines whether the compatible application can be activated as regards to the minor function indicated by the function information included in the received notice (P12). When the control device 101 determines that the compatible application can be activated (P12: Yes), the control device 101 activates the compatible application (P13), and requests the MFP 10 to transmit the scan conditions (P14).

When the current reading mode is the second reading mode (S16: Yes), the CPU 11 of the MFP 10 transmits current scan conditions to the terminal apparatus 100, as input scan conditions, if the request for transmission of the scan conditions is received from the terminal apparatus 100 (S17). In the meantime, the current scan conditions are the scan conditions included in the selected shortcut, or the scan conditions changed after the option button 53d is operated.

When the input scan conditions are received from the MFP 10, the control device 101 of the terminal apparatus 100 sets the execution scan conditions from the input scan conditions and the registered scan conditions (P15).

Here, the processing of P15 is specifically described with reference to FIG. 5. In FIG. 5, each setting item and a reading setting value for each setting item are shown with respect to the registered scan conditions, the input scan conditions and the execution scan conditions set by the processing of P15 from both the scan conditions. In the processing of P15, the control device 101 sets the execution scan conditions by combining the input scan conditions and conditions, which are parts of the registered scan conditions and do not overlap with the input scan conditions.

More specifically, when the reading setting value of the registered scan condition and the reading setting value of the input scan condition are different from each other with respect to a setting item of the setting items configuring the registered scan conditions, which overlaps with the input scan condition, the control device 101 sets the reading setting value of the input scan condition as the reading setting value of the execution scan condition. Therefore, for example, as shown in FIG. 5, the control device 101 preferentially sets the reading setting values of the input scan conditions for the setting items from a scan type to a background color removal, which are the setting items, which overlap between the input scan conditions and the registered scan condition, of the respective setting items configuring the execution scan conditions.

In this way, when the reading setting value of the registered scan condition and the reading setting value of the input scan condition are different from each other, the reading setting value of the input scan condition is set as the reading setting value of the execution scan condition. Therefore, it is possible to suppress the second reading mode from being executed with the reading setting values different from the reading setting values of the input scan conditions.

Returning to FIG. 3, when the control device 101 of the terminal apparatus 100 determines in P12 that the compatible application cannot be activated (P12: No), the control device 101 sets the registered scan conditions to the execution scan conditions (P16). The control device 101 transmits the scan instruction to the MFP 10 (P17e) after the processing of P15 or P16. In the scan instruction, the execution scan conditions set in P15 or P16 are included.

When the scan instruction is received from the terminal apparatus 100, the CPU 11 of the MFP 10 determines whether the information 14a3 indicating whether or not activation is allowed obtained in S12 is the information indicating that the compatible application is to be activated when the notice of scan start is received from the MFP 10 (S18), like the processing of S13.

When it is determined that the compatible application is to be activated (S18: Yes), the CPU 11 determines whether some of the execution scan conditions included in the scan instruction match with all the input scan conditions (S19). Specifically, the CPU 11 determines whether the reading setting value of each setting item of the execution scan conditions included in the received scan instruction, which relates to the setting item of the input scan condition, matches with the reading setting value of the input scan condition.

When it is determined that both the values match with each other (S19: Yes), the CPU 11 displays a screen under scanning 55 (refer to FIG. 4) on the LCD 16 and executes the scan operation in accordance with the received execution scan conditions (S21). That is, the CPU 11 executes the scan operation in accordance with the execution scan conditions in which the priority is placed on the input scan conditions. When the scan operation is over, the CPU 11 transmits the read data obtained by the scan operation to the terminal apparatus 100 of the connection destination (S22).

On the other hand, when the CPU 11 determines that some of the execution scan conditions included in the received scan instruction do not match with all the input scan conditions (S19: No), the CPU 11 displays a warning screen 56 (refer to FIG. 4) on the LCD 16 (S20).

As shown in FIG. 4, in the warning screen 56, a message 56a, which notifies the user that some of the execution scan conditions do not match with all the input scan conditions, and an OK button 56b are displayed. Since the terminal apparatus 10 periodically (for example, every 10 minutes) transmits the information indicating whether or not activation is allowed, there occurs a time lag between a timing at which the setting state of whether the compatible application is to be activated at the terminal apparatus 100 is changed and a timing at which the table 14a indicating whether or not activation is allowed is updated by the information indicating whether or not activation is allowed corresponding to the change. Therefore, when the control device 101 of the terminal apparatus 100 determines in P12 that the compatible application cannot be activated even though the first screen 53 is displayed at the MFP 10, a situation where the MFP 10 receives, as the execution scan conditions, the registered scan conditions occurs.

Regarding the setting item common to the registered scan conditions and the input scan conditions, when the reading setting values of both the conditions are different, the scan operation is executed in accordance with the scan conditions different from the scan conditions displayed in the first screen 53. Therefore, the user obtains a scan result different from the scan result assumed from the displayed scan conditions. In contrast, according to this illustrative embodiment, when some of the execution scan conditions included in the received scan instruction do not match with all the input scan conditions, the message 56a notifying the corresponding situation is displayed. Therefore, the user can recognize from the message 56a in advance that the scan operation is to be executed in accordance with the scan conditions different from the scan conditions displayed in the first screen 53.

The OK button 56b is a button indicating that the user has confirmed the warning screen 56. When the CPU 11 of the MFP 10 receives an operation to the OK button 56b, the CPU 11 proceeds to the processing of S21 and executes the scan operation in accordance with the received execution scan conditions.

When the CPU 11 determines in S18 that the compatible application is not to be activated (S18: No), the CPU 11 executes the scan operation in accordance with the execution scan conditions received from the terminal apparatus 100 by the MFP 10, i.e., the registered scan conditions (S21). Even when the current reading mode is the first reading mode (S16: No), the CPU 11 executes the scan operation in accordance with the execution scan conditions received from the terminal apparatus 100 by the MFP 10 (S21).

Figure 6B:
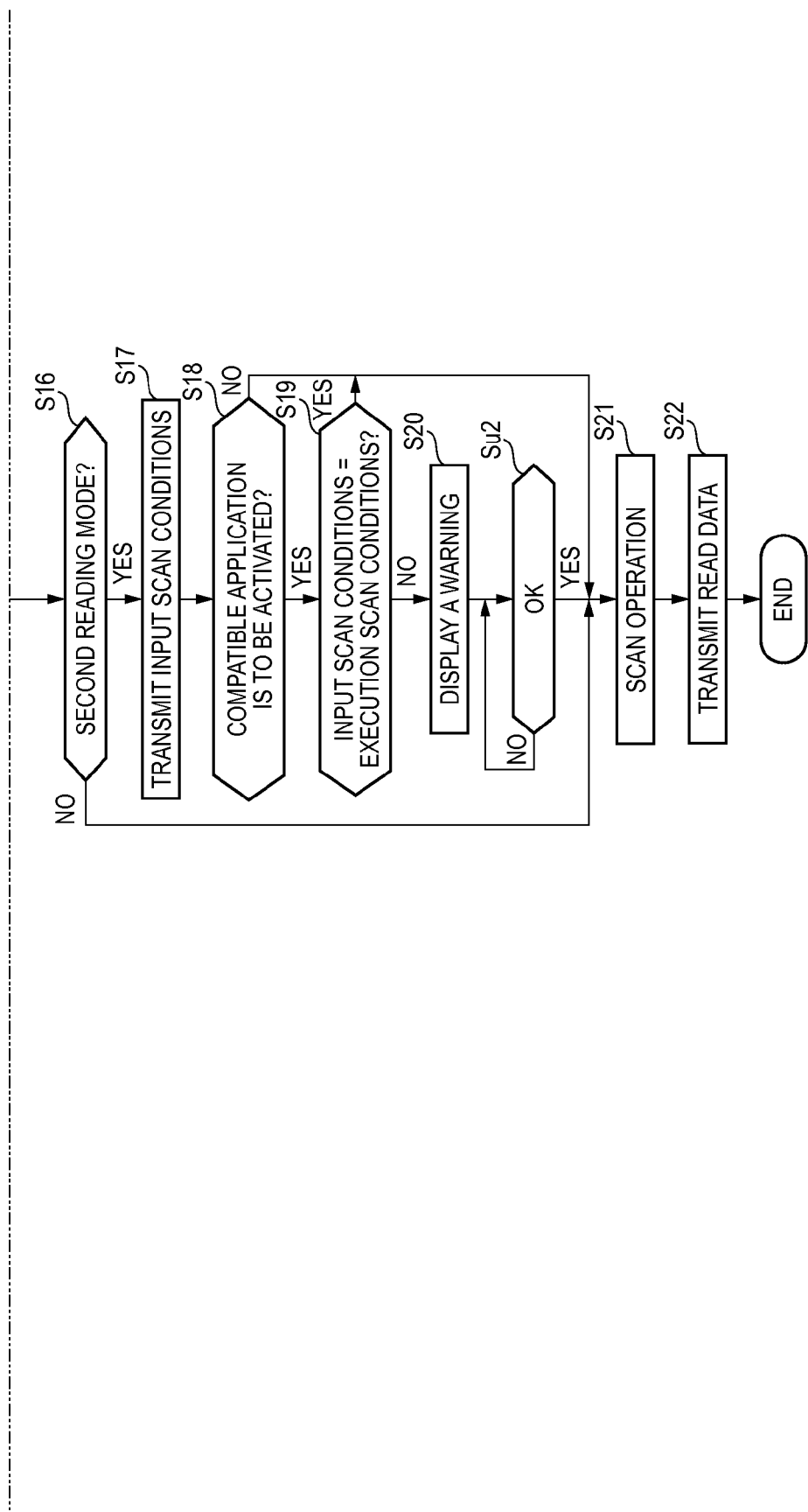

FIGS. 6A-6B are flowcharts showing scan processing that is to be executed by the CPU 11 of the MFP 10. The processing starts when the CPU 11 receives the selection of the registration button 51a relating to the shortcut of the second reading mode. In the meantime, since some of the respective processing shown in the flowchart has been already described in the sequence diagram of FIG. 3, the described processing is denoted with the same reference numerals and the descriptions thereof are omitted. Determination processing of Su1a and Su1b is processing of determining whether the CPU 11 receives the user's operation to the start button 53c or 54c in the sequence diagram of FIG. 3. Also, determination processing of Su2 is processing of determining whether the CPU 11 receives the user's operation to the OK button 56b in the sequence diagram of FIG. 3.

While the first screen 53 is displayed, the CPU 11 waits for the operation to any one of the start button 53c, the option button 53d and the shortcut registration button 53e (Su1a: No, Su3: No, Su4: No). When the CPU 11 receives the operation to the option button 53d (Su1a: No, Su3: Yes), the CPU 11 displays the option screen (not shown) on the LCD 16 (S41).

The CPU 11 executes scan condition changing processing (S42). In the scan condition changing processing (S42), the CPU 11 changes the scan conditions or the reading mode in accordance with the operation on the option screen. In the meantime, when the reading mode is changed to the first reading mode, the scan conditions cannot be changed. When an operation on a change confirmation button displayed in the option screen is received, the CPU 11 confirms the change in the scan conditions or the reading mode and ends the scan condition changing processing (S42). After the scan condition changing processing (S42), the CPU 11 proceeds to the processing of S14.

On the other hand, when the CPU 11 receives the operation to the shortcut registration button 53e (Su3: No, Su4: Yes), the CPU 11 displays a registration confirmation screen (not shown) on the LCD 16 (S43). In the registration confirmation screen, each information to be newly registered as a shortcut and a registration confirmation button are displayed.

Each information to be displayed in the registration confirmation screen includes the current reading mode, the current scan conditions, the function information specifying the minor function to be used, the apparatus name specifying the terminal apparatus 100 becoming the transmission destination of the read data, and the registration name specifying the shortcut. In the meantime, when the current reading mode is the first reading mode, the scan conditions are not displayed.

The CPU 11 executes new registration processing (S44). The new registration processing (S44) is processing of registering, as a new shortcut, each information to be displayed in the registration confirmation screen. When an operation to the registration confirmation button displayed in the registration confirmation screen is received, the CPU 11 registers, as a new shortcut, each information to be displayed in the registration confirmation screen in the NVRAM 14 and ends the new registration processing (S44).

Therefore, according to the new registration processing (S44), the current reading mode, the function information, the current scan conditions, the apparatus name, and the registration name are registered as a new shortcut. In the meantime, when the current reading mode is the first reading mode, the scan conditions are not included in the registered shortcut. When the scan conditions or the reading mode is changed in accordance with the operation on the option screen, a shortcut in which the change is reflected is registered. Therefore, it is possible to easily register the shortcut in accordance with the user's intention.

While the second screen 54 is displayed, the CPU 11 waits for an operation of any one of the start button 54c and the shortcut registration button 54e (Su1b: No, Su5: No). When the CPU 11 receives an operation to the shortcut registration button 54e (Su5: Yes), the CPU 11 displays a registration confirmation screen (not shown) on the LCD 16 (S51).

The registration confirmation screen displayed in S51 is the same as the registration confirmation screen displayed in S43. However, the information displayed in the registration confirmation screen displayed in S51 includes the reading mode included in the original shortcut, the function information specifying the minor function to be used, the apparatus name specifying the terminal apparatus 100 becoming the transmission destination of the read data, and the registration name specifying the shortcut.

The CPU 11 executes the same new registration processing as the new registration processing of S43 (S52). In the new registration processing of S52, the current reading mode, the function information, the apparatus name, and the registration name are registered as a new shortcut. That is, unlike the new registration processing of S44, the shortcut to be registered in the new registration processing of S52 does not include the scan conditions included in the original shortcut.

The second screen 54 is a screen that is to be displayed if the compatible application is not to be activated at the terminal apparatus of the connection destination when the notice of scan start is received from the MFP 10. Therefore, there is a possibility that the compatible application will not be activated at the terminal apparatus. Therefore, it is possible to register a shortcut corresponding to a situation of the setting relating to whether the compatible application is to be activated at the terminal apparatus of the connection destination.

According to the first illustrative embodiment, the scan conditions included in the selected shortcut are not displayed in the second screen 54, which is to be displayed if the compatible application is not to be activated at the terminal apparatus of the connection destination when the notice of scan start is received from the MFP 10. Therefore, it is possible to suppress the scan result contrary to the user's intention from being obtained, which is caused as the scan operation is executed with the conditions different from the displayed scan conditions. Also, since the display 54a indicating the apparatus name of the connection destination is displayed in the second screen 54, the user can recognize which terminal apparatus 100 is the terminal apparatus of the connection destination. Therefore, it is possible to improve the convenience of the scan operation that is to be executed using the shortcut including the scan conditions for the scan operation by the second reading mode.

Subsequently, a second illustrative embodiment of the present disclosure is described with reference to FIGS. 7 and 8. In the first illustrative embodiment, if the compatible application is not to be activated at the terminal apparatus of the connection destination when the notice of scan start is received from the MFP 10, the scan operation is executed in accordance with the registered scan conditions, without inquiring of the user whether or not to use the registered scan conditions.

Instead of this configuration, according to the second illustrative embodiment, only when the user expresses an intention to utilize, the scan operation is executed in accordance with the registered scan conditions. In the second illustrative embodiment, the same parts as the first illustrative embodiment are denoted with the same reference numerals and the descriptions thereof are omitted. In the below, the differences from the first illustrative embodiment are described.

Figure 7:
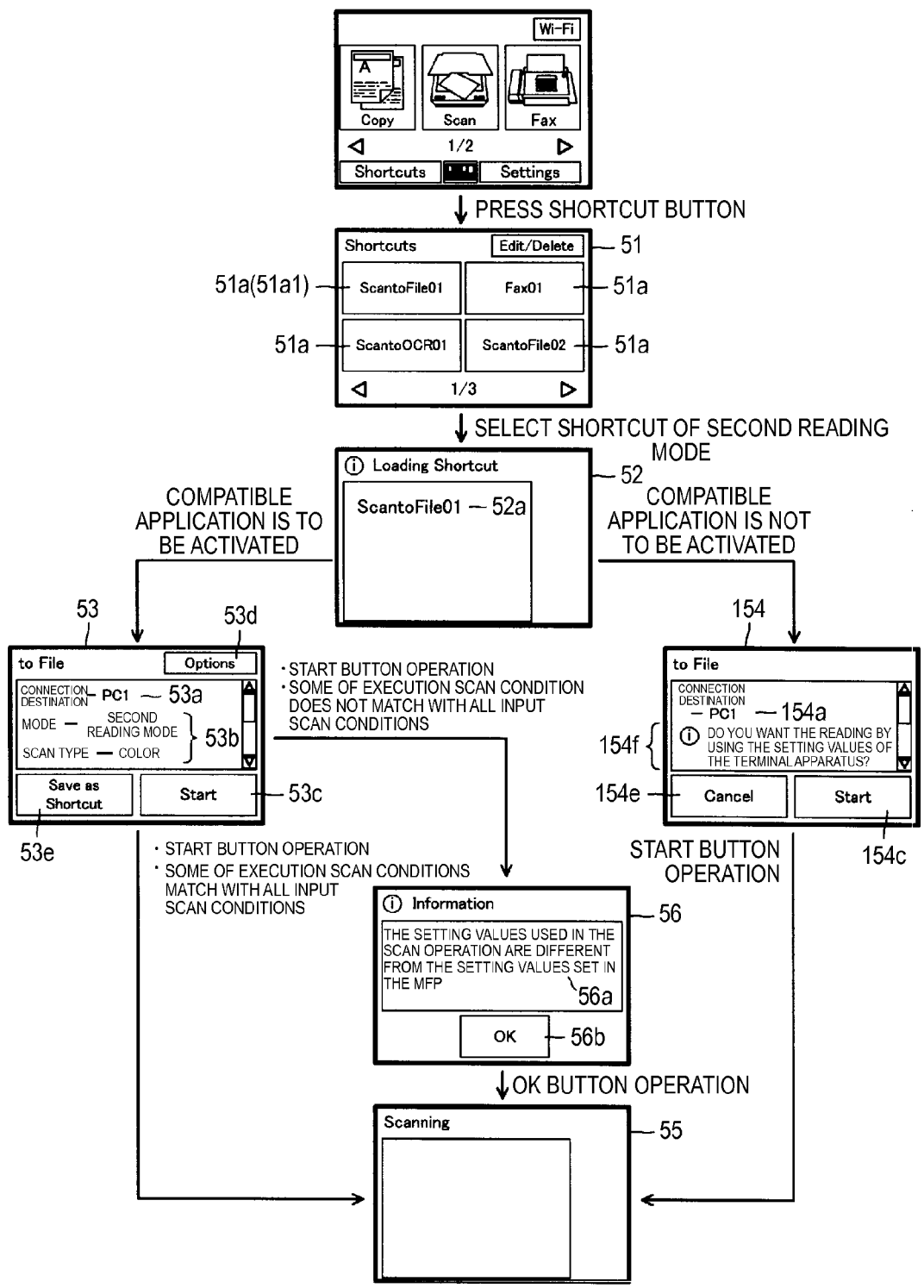
FIG. 7 illustrates an example of the screen transition in a second illustrative embodiment.

FIG. 7 illustrates an example of the screen transition of the second illustrative embodiment. As shown in FIG. 7, in the second illustrative embodiment, the display contents on a second screen 154 are different from the display contents of the second screen 54 of the first illustrative embodiment. In the second screen 154, a display 154a indicating the apparatus name of the connection destination, a start button 154c, and a cancel button 154e are displayed.

Also, in the second screen 154, an inquiry 154f, which inquires whether or not to perform the scan operation by using the registered scan conditions, is displayed. That is, the second screen 154 functions as an inquiry screen. When the CPU 11 receives an operation to the start button 154c, the CPU 11 regards that the user has expressed the intention of performing the scan operation by using the registered scan conditions, and executes the scan operation.

On the other hand, when the CPU 11 receives an operation to the cancel button 154e, the CPU 11 regards that the user has expressed the intention of not performing the scan operation by using the registered scan conditions, and ends the processing without executing the scan operation.

Figure 8A:
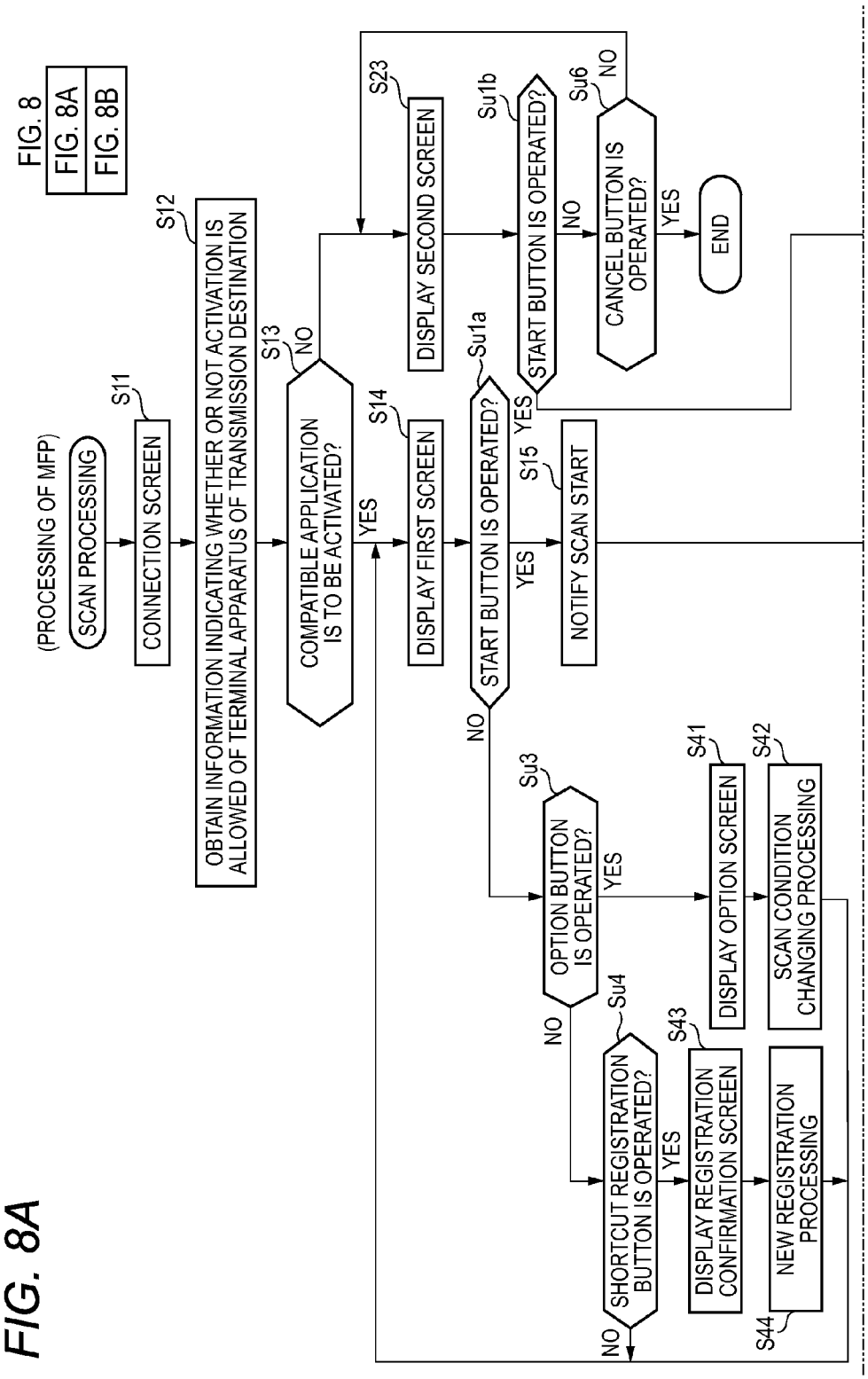
FIGS. 8A-8B are flowcharts showing scan processing of the second illustrative embodiment.
Figure 8B:
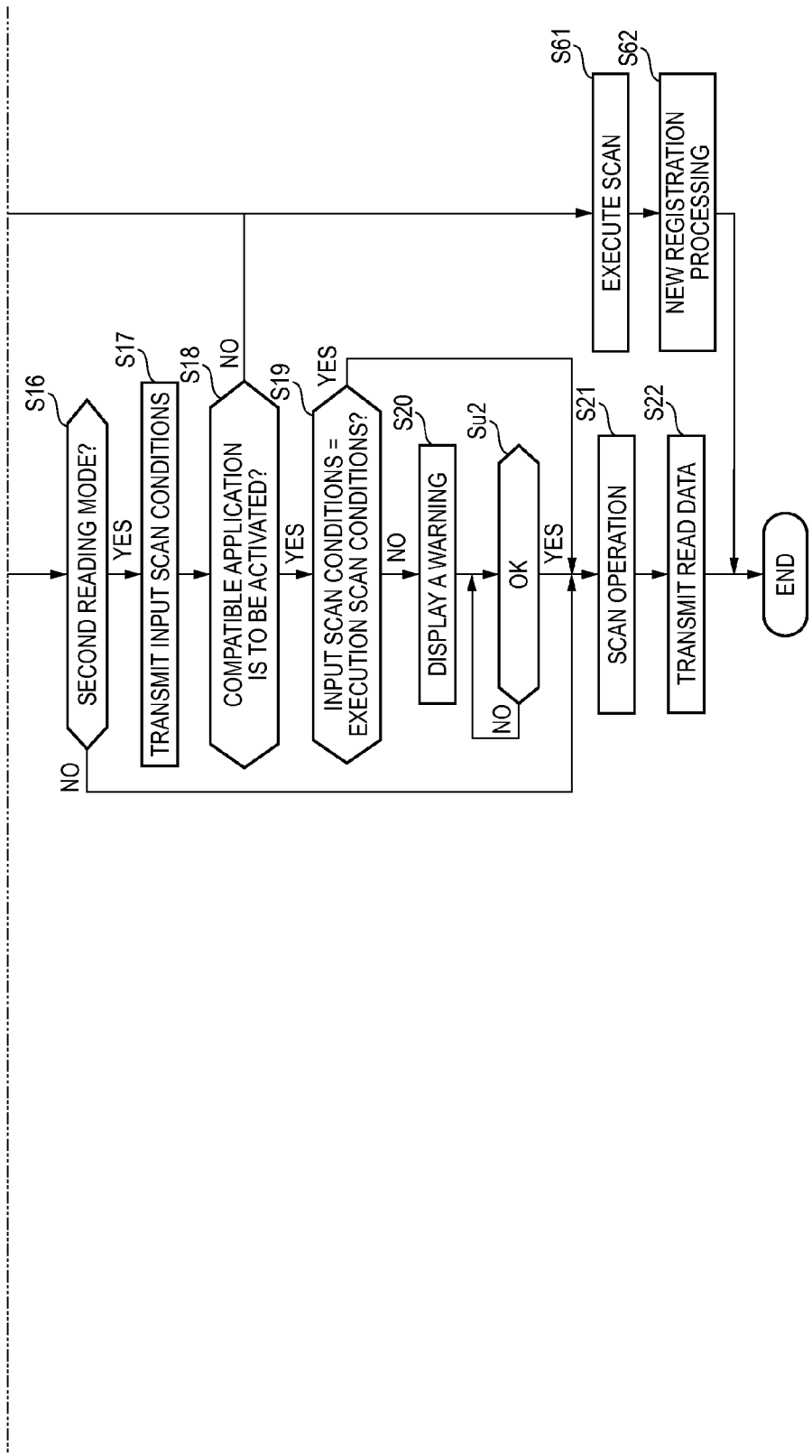

FIGS. 8A-8B are flowcharts showing the scan processing of the second illustrative embodiment. While the second screen 154 is displayed, the CPU 11 waits for an operation to any one of the start button 154c and the cancel button 154e (Su1b: No, Su6: No). When the CPU 11 receives an operation to the cancel button 154e (Su6: Yes), the CPU 11 ends the processing.

When the start button 154c is operated on the second screen 154 (Su1b: Yes), the CPU 11 executes the scan operation in accordance with the execution scan conditions received from the terminal apparatus 100, i.e., the registered scan conditions (S61). The same operation is executed when the CPU 11 determines in S18 that the compatible application is not activated (S18: No).

The CPU 11 executes the same new registration processing as the new registration processing of S52 (S62). That is, the current reading mode, the function information, the apparatus name, and the registration name are registered as a new shortcut. That is, the shortcut registered in the new registration processing of S62 does not include the scan conditions included in the original shortcut.

According to the second illustrative embodiment, when the compatible application is not to be activated at the terminal apparatus 100 of the connection destination and the scan conditions included in the selected shortcut cannot be used, the user avoids the unintended scan result by operating the cancel button 154e.

On the other hand, when the user expresses the intention of performing the scan operation using the registered scan conditions by operating the start button 154c, the user can execute the scan operation using the registered scan conditions. After the scan operation is executed, the new shortcut, which does not include the scan conditions included in the original shortcut, is registered. Therefore, it is possible to easily register the shortcut in accordance with the user's intention.

In the above illustrative embodiments, the MFP 10 is an example of the image reading apparatus. The control program 12a is an example of the image reading program. The terminal apparatus 100 (100A to 100E) is an example of the external apparatus. The CPU 11 is an example of the control device. The network I/F 22 and the USB_I/F 23 are examples of the communication device. The scanner device 18 is an example of the reading device. The NVRAM 14 is an example of the storage. The LCD 16 is an example of the display device. The operation key 15 and the touch panel 17 are examples of the input device. The start button 53c is an example of the first operation element. The option button 53d is an example of the second operation element. The shortcut registration buttons 53e, 54e are examples of the third operation element. The first screen 53 is an example of the first screen. The second screen 54 is an example of the second screen.

The CPU 11 configured to execute the processing of S1 is an example of the reception unit. The CPU 11 configured to execute the processing of S2 is an example of the activation information storage unit. The CPU 11 configured to execute the processing of S13 is an example of the first determination unit. The CPU 11 configured to execute the processing of S14 is an example of the first display unit. The CPU 11 configured to execute the processing of S21 is an example of the first scan unit and the second scan unit. The CPU 11 configured to execute the processing of S23 is an example of the second display unit, the first notification unit, and the inquiry unit. The CPU 11 configured to execute the processing of S22 is an example of the transmission unit. The CPU 11 configured to execute the processing of S11 is an example of the third display unit. The CPU 11 configured to execute the processing of S19 is an example of the second determination unit. The CPU 11 configured to execute the processing of S20 is an example of the second notification unit. The CPU 11 configured to execute the processing of S44 is an example of the first shortcut storage unit. The CPU 11 configured to execute the processing of S52 is an example of the second shortcut storage unit. The CPU 11 configured to execute the processing of S62 is an example of the third shortcut storage unit.

Although the present disclosure has been described with reference to the illustrative embodiments, the present disclosure is not limited to the illustrative embodiments, and a variety of improvements and changes can be made without departing from the gist of the present disclosure.

For example, in the above illustrative embodiments, the MFP 10, which is a multifunctional peripheral, has been exemplified as the image reading apparatus of the present disclosure. However, an apparatus having at least a scan function such as a scanner can be applied as the image reading apparatus of the present disclosure.

In the above illustrative embodiments, each of the terminal apparatuses 100 is configured to periodically transmit the information indicating whether or not activation is allowed for all of the function information to the MFP 10, and the MFP 10 is configured to receive the information indicating whether or not activation is allowed. Instead of this configuration, the MFP 10 may be configured to periodically or occasionally send an inquiry to each of the terminal apparatuses 100 and to receive the information indicating whether or not activation is allowed.

Alternatively, when there is a change in the information indicating whether or not activation is allowed as regards some function information at each of the terminal apparatuses 100, the terminal apparatus 100 may transmit the changed information indicating whether or not activation is allowed to the MFP 10. In this case, the terminal apparatus 100 may be configured to transmit only the changed information indicating whether or not activation is allowed to the MFP 10, or to transmit the respective information indicating whether or not activation is allowed for all the function information, which includes the changed information indicating whether or not activation is allowed, to the MFP 10.

Also, in the above illustrative embodiments, as the terminal apparatus 100 configuring the system 1, the terminal apparatuses 100A to 100E configured to transmit the information indicating whether or not activation is allowed have been exemplified. However, a terminal apparatus configured to not transmit the information indicating whether or not activation is allowed may also be adopted as the terminal apparatus 100. When a terminal apparatus configured to not transmit the information indicating whether or not activation is allowed is adopted as the terminal apparatus 100, the respective information 14a1 to 14a3 corresponding to the terminal apparatus is not stored in the table 14a indicating whether or not activation is allowed. Therefore, in S13 and S18, the CPU 11 of the MFP 10 may determine that the compatible application is not to be activated at the terminal apparatus having the table 14a indicating whether or not activation is allowed in which the respective information 14a1 to 14a3 is not stored. According to this modified embodiment, when the terminal apparatus 100 of the transmission destination is configured to not transmit the information indicating whether or not activation is allowed, the second screen 54 is displayed.

In the above illustrative embodiments, the apparatus name 14a1 is stored, as the information specifying the terminal apparatus 100, in the table 14a indicating whether or not activation is allowed. However, an IP address or MAC address of the terminal apparatus 100 may be stored in the table 14a indicating whether or not activation is allowed, instead of the apparatus name 14a1, inasmuch as it is information capable of specifying the terminal apparatus 100. In this modified embodiment, the IP address or MAC address that is to be stored in the table 14a indicating whether or not activation is allowed is an example of the 'specific information'. Also, in this modified embodiment, the apparatus name included in the shortcut information and the IP address or MAC address of the terminal apparatus 100 are associated and stored in the NVRAM 14, so that it is possible to associate the apparatus name included in the shortcut information and the information 14a3 indicating whether or not activation is allowed, which is to be stored in the table 14a indicating whether or not activation is allowed.

In the above illustrative embodiments, some of the respective setting items configuring the registered scan conditions are the same as the setting items configuring the input scan conditions. However, all the setting items configuring the registered scan conditions may be the same as the setting items configuring the input scan conditions. In this modified embodiment, the CPU 11 of the MFP 10 may be configured to determine in S19 whether all the execution scan conditions match with all the input scan conditions.

In the above illustrative embodiments, the terminal apparatus 100 is configured to set the execution scan conditions from the input scan conditions received from the MFP 10 and the registered scan condition. Instead of this configuration, when the MFP 10 can receive all the reading setting values necessary to perform the scan operation through the touch panel 17 and the like, the terminal apparatus 100 may set the execution scan conditions from only the input scan conditions received from the MFP 10.

In the above illustrative embodiments, when the registration button 51 is selected, the connection screen 52 is displayed before the first screen 53 or the second screen 54 is displayed. However, the first screen 53 or the second screen 54 may be displayed without displaying the connection screen 52.

In the above illustrative embodiments, the display 52a, which indicates the registration name of the selected shortcut, is displayed in the connection screen 52. However, the registration name of the selected shortcut may be displayed in the first screen 53 or the second screen 54.

In the above illustrative embodiments, the message 54f, which notifies the user that the registered scan conditions are to be used, is displayed in the second screen 54. However, the message may be displayed in a pop-up manner. Also, the message 54f may be displayed in a screen different from the second screen 54.

In the above illustrative embodiments, when the start button 53c is operated, if some of the execution scan conditions do not match with all the input scan conditions, the warning screen 56 is displayed. Instead of this configuration, the message 56a, which notifies the user that some of the execution scan conditions do not match with all the input scan conditions, may be displayed in the screen under scanning 55.

Also, when the start button 54c of the second screen 54 is operated, if some of the execution scan conditions do not match with all the input scan conditions, the warning screen 56 may be displayed. This modified embodiment can be implemented by omitting the processing of S18. In this modified embodiment, the CPU 11 configured to execute the processing of S19 is an example of the third determination unit. Also, the CPU 11 configured to execute the processing of S20 is an example of the third notification unit. According to this modified embodiment, the user can recognize in advance from the warning screen 56 that the scan operation is to be executed in accordance with scan conditions different from the scan conditions included in the selected shortcut.

In the above illustrative embodiments, the message 54*f*, which notifies the user that the registered scan conditions are to be used, is displayed in the second screen 54. The message to be displayed in the second screen 54 may be a message notifying the user that the scan conditions included in the selected shortcut are not to be used. According to this modified embodiment, the user can recognize from the message displayed in the second screen 54 that the scan conditions included in the shortcut, i.e., the scan conditions received through the touch panel 17 and the like are not to be used.

In the above illustrative embodiments, when the CPU 11 determines in S18 that the compatible application is not to be activated (S18: No), the CPU 11 executes the scan operation in accordance with the execution scan conditions received from the terminal apparatus 100 by the MFP 10, i.e., the registered scan conditions (S21). Herein, when the CPU 11 determines in S18 that the compatible application is not to be activated (S18: No), the CPU 11 may display the warning screen 56 on the LCD 16 (S20) and, in response to receiving the operation to the OK button 56*b*, proceed to the processing of S21 and execute the scan operation in accordance with the received execution scan conditions.

In the above illustrative embodiments, only the OK button 56*a* is displayed in the warning screen 56. However, a cancel button, which is the same as the cancel button 154*e*, may be provided. In this modified embodiment, when the cancel button in the warning screen 56 is operated, the scan operation is not performed, and the screen displayed on the LCD 16 transitions to the shortcut screen.

In the above illustrative embodiments, the new shortcut is registered in S44, S52 and S62. However, the contents of the original shortcut may be updated.

In the above illustrative embodiments, the CPU 11 is configured to execute the processing to be executed by the MFP 10 of the respective processing shown in the sequence diagram of FIG. 3 and the respective processing shown in the flowcharts of FIGS. 6 and 8. However, a plurality of CPUs may be configured to cooperatively execute the processing shown in the respective drawings. Also, a single or a plurality of ICs such as ASIC may be configured to execute solely or cooperatively the processing shown in the respective drawings. Also, the CPU 11 and the IC such as ASIC may be configured to cooperatively execute the processing shown in the respective drawings.

Also, some of the respective processing shown in FIGS. 3, 6 and 8 may be omitted or changed without departing from the scope of the claims. Also, the respective features described in the illustrative embodiment and the respective modified embodiments may be implemented with being appropriately combined.

According to the image reading apparatus of the disclosure, when the activation information, which indicates that the specific application is to be activated at the external apparatus specified by the apparatus name included in the selected shortcut information, is stored in the storage, the first screen including the apparatus name and reading setting values included in the selected shortcut information and the first operation element for inputting a start instruction of the scan operation is displayed. On the other hand, when the activation information, which indicates that the specific application is to be activated at the external apparatus specified by the apparatus name included in the selected shortcut information, is not stored, the reading setting value included in the selected shortcut information are not displayed on the display device, and the second screen including the apparatus name included in the shortcut information and the first operation element is displayed.

If the reading setting values included in the selected shortcut information are displayed even though the specific application is not to be activated and the scan operation cannot be performed in accordance with the reading setting values included in the selected shortcut information, the scan operation may be executed in accordance with the reading setting values different from the displayed reading setting values. For this reason, the user may obtain the scan result different from the scan result that is assumed from the displayed reading setting values. In contrast, when the activation information, which indicates the setting that the specific application is to be activated, is not stored in the storage, the reading setting values included in the selected shortcut information are not displayed, so that it is possible to avoid the above problem.

On the other hand, even when the activation information, which indicates the setting that the specific application is to be activated, is not stored in the storage, the apparatus name included in the selected shortcut information is displayed in the second screen. Therefore, the user can recognize to which external apparatus the read data is to be transmitted. Therefore, according to the present disclosure, it is possible to improve the convenience when executing the scan operation by using the shortcut information including the reading setting values set at the image reading apparatus.

According to the image reading apparatus of the disclosure, since the registration name associated with the selected shortcut information is displayed, the user can recognize which shortcut information is used to perform the scan operation.

According to the image reading apparatus of the disclosure, when the activation information, which indicates the setting that the specific application is to be activated, is not stored, the message, which indicates that the reading setting values preset in the external apparatus specified by the apparatus name included in the selected shortcut information are to be used, is displayed before the scan operation is executed. Therefore, before the scan operation is executed, the user can recognize that the reading setting values preset in the external apparatus, not the reading setting values included in the shortcut information, are to be used.

According to the image reading apparatus of the disclosure, when the activation information, which indicates the setting that the specific application is to be activated, is not stored, the message, which indicates that the reading setting values included in the selected shortcut information cannot be used, is displayed before the scan operation is executed. Therefore, before the scan operation is executed, the user can recognize that the reading setting values included in the shortcut information are not to be used.

According to the image reading apparatus of the disclosure, the activation information is repeatedly transmitted from the external apparatus. Therefore, there may occur a time lag between a timing at which the setting state of whether the specific application is to be activated at the external apparatus is changed and a timing at which the contents of the storage are updated by the activation information corresponding to the change. Due to the time lag, a situation may occur where the activation information, which indicates the setting that the specific application is to be activated, is stored at a timing at which the shortcut information is selected but the setting state is changed to the setting state where the specific application is not to be activated at the external apparatus at a timing at which the first operation element in the first screen is operated. In this situation, since the image reading apparatus receives the reading setting values preset in the external apparatus, there is a concern that a scan result different from the originally intended scan result will be obtained.

In contrast, in case that the activation information, which indicates the setting that the specific application is to be activated, is stored, when one or more of the reading setting values, which are received from the external apparatus as the reading setting values included in the shortcut information are transmitted, do not match with all the reading setting values included in the selected shortcut information, the corresponding situation is displayed. Therefore, the user can recognize in advance from the display that the scan operation is to be executed in accordance with the reading setting values different from the reading setting values included in the selected shortcut information.

According to the image reading apparatus of the disclosure, in case that the activation information, which indicates the setting that the specific application is to be activated, is not stored, when one or more of the reading setting values preset in the external apparatus, which are received from the external apparatus, do not match with all the reading setting values included in the selected shortcut information, the corresponding situation is displayed. Therefore, the user can recognize in advance from the display that the scan operation is to be executed in accordance with the reading setting values different from the reading setting values included in the selected shortcut information.

According to the image reading apparatus of the disclosure, the second operation element for instructing the change of the reading setting values included in the selected shortcut information is displayed in the first screen. When an operation of changing the reading setting values included in the selected shortcut information is received after an operation to the second operation element is received, the scan operation is executed in accordance with the reading setting values in which the change is reflected. Therefore, when the activation information, which indicates the setting that the specific application is to be activated, is stored, it is possible to execute the scan operation by using the appropriate reading setting values. In the meantime, the second operation element is not displayed in the second screen. Therefore, it is possible to prevent the user from performing a useless operation of changing the unusable reading setting values.

According to the image reading apparatus of the disclosure, while the first screen is displayed, it is possible to change the reading setting value to be used for the scan operation from the reading setting value included in the shortcut information to the reading setting value preset in the external apparatus by using the second operation element. Therefore, even when the activation information, which indicates the setting that the specific application is to be activated, is stored, it is possible to execute the scan operation in accordance with reading setting values preset in the external apparatus.

According to the image reading apparatus of the disclosure, when the activation information, which indicates the setting that the specific application is to be activated, is stored, if the third operation element is operated after the reading setting value included in the shortcut information is changed, the shortcut information including the changed reading setting value is stored. Therefore, since it is possible to prepare the shortcut information in which the change is reflected, it is possible to easily prepare the shortcut information in accordance with the user's intention.

According to the image reading apparatus of the disclosure, when the activation information, which indicates the setting that the specific application is to be activated, is stored, if the third operation element is operated, the shortcut information, which does not include the reading setting values included in the selected shortcut information and includes the apparatus name included in the selected shortcut information, is stored. In the external apparatus in which the activation information, which indicates the setting that the specific application is not to be activated, is stored, also the specific application may not be activated in the future. Therefore, it is possible to prepare the shortcut information in accordance with the setting state relating to the activation of the specific application in the external apparatus.

According to the image reading apparatus of the disclosure, when the activation information, which indicates the setting that the specific application is to be activated, is not stored, an inquiry of whether or not to use the reading setting values preset in the external apparatus may be performed, before the scan operation is executed. Therefore, it is possible to determine whether or not to use the reading setting values preset in the external apparatus, in accordance with the user's intention. Also, when the user selects to use the reading setting values preset in the external apparatus, the shortcut information, which does not include the reading setting values included in the selected shortcut information and includes the apparatus name included in the selected shortcut information, is stored on condition that the scan operation has been executed. Therefore, it is possible to easily prepare the shortcut information in accordance with the user's intention.

According to the image reading apparatus of the disclosure, the specific application has the function of generating the reading setting values, which are to be used in the scan operation, from the reading setting values included in the shortcut information and the reading setting values preset in the external apparatus with placing priority on the reading setting values included in the shortcut information. Thereby, when the activation information, which indicates the setting that the specific application is to be activated, is stored, it is possible to execute the scan operation in accordance with the reading setting values included in the selected shortcut information.

What is claimed is:
1. An image reading apparatus comprising:
a communication device configured to perform communication with an external apparatus;
a reading device configured to execute a scan operation of reading a document;
a display device;
an input device configured to receive an operation;
a storage storing shortcut information having specific information for specifying an external apparatus to be a transmission destination of read data obtained by the scan operation and reading setting values set on the basis of an operation received by the input device, the specific information and the reading setting values being associated with each other; and a control device configured to:
- receive activation information, indicating whether or not a setting that a specific application is to be activated is made at an external apparatus, from the external apparatus through the communication device;
- associate the received activation information with the specific information for specifying the external apparatus which is a transmission source of the activation information and store the associated received activation and specific information in the storage;
- in response to the input device receiving an operation of selecting one shortcut information from the shortcut information stored in the storage, determine whether the activation information, indicating that the setting that the specific application is to be activated is made at the external apparatus specified by the specific information included in the selected shortcut information, is stored in the storage;
- when it is determined that the activation information, indicating that the setting that the specific application is to be activated, is stored, display a first screen on the display device, the first screen comprising the specific information, reading setting values and a first operation element, the specific information and the reading setting values being included in the selected shortcut information, the first operation element being for inputting a start instruction of the scan operation;
- execute a first scan operation in accordance with the reading setting values included in the selected shortcut information, on condition that the input device receives an operation to the first operation element on the first screen;
- when it is determined that the activation information, indicating that the setting that the specific application is to be activated, is not stored, display a second screen on the display device without displaying the reading setting values included in the selected shortcut information, the second screen comprising the specific information of the shortcut information and the first operation element;
- receive reading setting values preset in the external apparatus from the external apparatus specified by the specific information included in the selected shortcut information through the communication device, on condition that the input device receives an operation to the first operation element on the second screen, and execute a second scan operation in accordance with the received reading setting values; and
- transmit read data, obtained by the first scan operation or the second scan operation, to the external apparatus specified by the specific information included in the selected shortcut information through the communication device.

2. The image reading apparatus according to claim 1, wherein the shortcut information comprises a registration name specifying the shortcut information, and
wherein the control device is further configured to display the registration name associated with the selected shortcut information on the display device.

3. The image reading apparatus according to claim 1, wherein the control device is further configured to:

display a message on the display device before the scan operation is executed, the message indicating that the reading setting values preset in the external apparatus specified by the specific information included in the selected shortcut information are to be used, when it is determined that the activation information, indicating that the setting that the specific application is to be activated, is not stored.

4. The image reading apparatus according to claim 1, wherein the control device is further configured to:
display a message on the display device before the scan operation is executed, the message indicating that the reading setting values included in the selected shortcut information cannot be used, when it is determined that the activation information, indicating that the setting that the specific application is to be activated, is not stored.

5. The image reading apparatus according to claim 1, wherein the control device is configured to:
- receive the activation information repeatedly transmitted by the external apparatus; and
- update the activation information associated with the specific information specifying the external apparatus of the transmission source of the activation information to the received activation information when the activation information is received, and wherein the control device is further configured to:
- when it is determined that the activation information, indicating that the setting that the specific application is to be activated, is stored, determine whether one or more of reading setting values, received from the external apparatus specified by the specific information included in the shortcut information as the reading setting values included in the shortcut information are transmitted, match with all the reading setting values included in the selected shortcut information; and
- when it is determined that one or more of the reading setting values received from the external apparatus do not match with the reading setting values included in the selected shortcut information, display a third screen on the display device, the third screen indicating the reading setting values received from the external apparatus do not match with the reading setting values included in the selected shortcut information.

6. The image reading apparatus according to claim 1, wherein the control device is further configured to:
- when it is determined that the activation information, indicating that the setting that the specific application is to be activated, is not stored, determine whether one or more of reading setting values preset in the external apparatus, received from the external apparatus specified by the specific information included in the shortcut information, match with all the reading setting values included in the selected shortcut information; and
- when it is determined that one or more of the reading setting values received from the external apparatus do not match with all the reading setting values included in the selected shortcut information, display a third screen on the display device, the third screen indicating the reading setting values received from the external apparatus do not match with the reading setting values included in the selected shortcut information.

7. The image reading apparatus according to claim 1, wherein the control device is configured to:

display the first screen on the display device, the first screen comprising:
  the specific information and reading setting values included in the selected shortcut information;
  the first operation element, and
  a second operation element for instructing a change of the reading setting values included in the selected shortcut information;
display the second screen on the display device without displaying the reading setting values included in the selected shortcut information and the second operation element for instructing a change of the reading setting values included in the selected shortcut information, the second screen comprising:
  the specific information included in the shortcut information; and
  the first operation element; and
when the input device receives an operation of changing the reading setting values included in the selected shortcut information after receiving an operation to the second operation element on the first screen, execute the scan operation in accordance with the reading setting values in which the change is reflected.

8. The image reading apparatus according to claim 7, wherein the control device is configured to:
when the input device receives an operation of changing the reading setting values to be used in the scan operation to the reading setting values preset in the external apparatus specified by the specific information included in the selected shortcut information after receiving the operation to the second operation element on the first screen, receive the reading setting values preset in the external apparatus from the external apparatus specified by the specific information through the communication device and execute the scan operation in accordance with the received reading setting values.

9. The image reading apparatus according to claim 7, wherein the control device is configured to display the first screen on the display device, the first screen comprising a third operation element for instructing to store the shortcut information, and
wherein the control device is further configured to:
  after the input device receives the operation to the second operation element on the first screen, when the input device receives the operation of changing the reading setting values included in the selected shortcut information and then receives an operation to the third operation element on the first screen, store shortcut information, in which the reading setting values with reflected changes and the specific information included in the selected shortcut information are associated with each other, in the storage.

10. The image reading apparatus according to claim 1, wherein the control device is configured to display the second screen on the display device, the second screen comprising a third operation element for instructing to store the shortcut information, and
wherein the control device is further configured to:
  in response to the input device receiving an operation to the third operation element on the second screen, store shortcut information, including the specific information included in the selected shortcut information without including the reading setting values included in the selected shortcut information, in the storage.

11. The image reading apparatus according to claim 1, wherein the control device is further configured to:
  when it is determined that the activation information, indicating that the setting that the specific application is to be activated, is not stored, inquire whether or not to use the reading setting values preset in the external apparatus specified by the specific information included in the selected shortcut information before the scan operation is executed; and
  when the input device receives an operation indicating that the reading setting values preset in the external apparatus are to be used in response to the inquiry, execute the scan operation and then store shortcut information, including the specific information included in the selected shortcut information without including the reading setting values included in the selected shortcut information in the storage.

12. The image reading apparatus according to claim 1, wherein the specific application has a function of generating reading setting values, used for the first scan operation, from the reading setting values included in the shortcut information and the reading setting values preset in the external apparatus placing priority on the reading setting values included in the shortcut information, and
wherein when it is determined that the activation information, indicating that the setting that the specific application is to be activated, is stored, the control device is configured to:
  transmit the reading setting values included in the shortcut information to the external apparatus through the communication device;
  receive the reading setting values generated by the specific application from the external apparatus through the communication device on condition of a transmission; and
  execute the scan operation in accordance with the received reading setting values.

13. The image reading apparatus according to claim 1, wherein the specific information is a name of the external apparatus for specifying the external apparatus.

14. A non-transitory computer-readable medium having an image reading program stored thereon and readable by a computer of an image reading apparatus comprising a communication device configured to perform communication with an external apparatus, a reading device configured to execute a scan operation of reading a document, a display device, an input device configured to receive an operation, a storage storing shortcut information having specific information for specifying an external apparatus to be a transmission destination of read data obtained by the scan operation and reading setting values set on the basis of an operation received by the input device, the specific information and the reading setting values being associated with each other, and the computer, the image reading program, when executed by the computer, cause the image reading apparatus to perform operations comprising:
  receiving activation information, indicating whether or not a setting that a specific application is to be activated is made at an external apparatus, from the external apparatus through the communication device;
  associating the received activation information with the specific information for specifying the external apparatus which is a transmission source of the activation information and storing the associated received activation and specific information in the storage;

in response to the input device receiving an operation of selecting one shortcut information from the shortcut information stored in the storage, determining whether the activation information, indicating that the setting that the specific application is to be activated is made at the external apparatus specified by the specific information included in the selected shortcut information, is stored in the storage;

when it is determined that the activation information, indicating that the setting that the specific application is to be activated, is stored, displaying a first screen on the display device, the first screen comprising the specific information, reading setting values and a first operation element, the specific information and the reading setting values being included in the selected shortcut information, the first operation element being for inputting a start instruction of the scan operation;

executing a first scan operation in accordance with the reading setting values included in the selected shortcut information, on condition that the input device receives an operation to the first operation element on the first screen;

when it is determined that the activation information, indicating that the setting that the specific application is to be activated, is not stored, displaying a second screen on the display device without displaying the reading setting values included in the selected shortcut information, the second screen comprising the specific information of the shortcut information and the first operation element, on the display device;

receiving reading setting values preset in the external apparatus from the external apparatus specified by the specific information included in the selected shortcut information through the communication device, on condition that the input device receives an operation to the first operation element on the second screen, and executing a second scan operation in accordance with the received reading setting values; and transmitting read data, obtained by the first scan operation or the second scan operation, to the external apparatus specified by the specific information included in the selected shortcut information through the communication device.

* * * * *